United States Patent
Tadano

(10) Patent No.: US 7,582,871 B2
(45) Date of Patent: Sep. 1, 2009

(54) IMAGE PICKUP APPARATUS AND A SWITCHING-OVER METHOD FOR THE SAME

(75) Inventor: Shoji Tadano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/144,818

(22) Filed: Jun. 24, 2008

(65) Prior Publication Data

US 2009/0001268 A1 Jan. 1, 2009

(30) Foreign Application Priority Data

Jun. 26, 2007 (JP) .......................... P2007-167129

(51) Int. Cl.
*G01J 5/02* (2006.01)
*H04N 7/16* (2006.01)

(52) U.S. Cl. ............. 250/339.05; 250/330; 250/339.01; 250/339.14; 348/118; 348/119; 348/143; 348/148

(58) Field of Classification Search ................. 250/330, 250/339.01–339.05, 339.14; 348/118, 119, 348/143, 148
See application file for complete search history.

(56) References Cited

U.S. PATENT DOCUMENTS

2006/0274149 A1* 12/2006 Yoshizawa .................. 348/148

FOREIGN PATENT DOCUMENTS

| JP | 2002 142228 | 5/2002 |
|----|-------------|--------|
| JP | 2005 6066 | 1/2005 |
| JP | 2005 286535 | 10/2005 |

* cited by examiner

*Primary Examiner*—David P Porta
*Assistant Examiner*—Casey Bryant
(74) *Attorney, Agent, or Firm*—Frommer Lawrence & Haug LLP; William S. Frommer

(57) ABSTRACT

An image pickup apparatus for outputting an image corresponding to a situation of a subject to an outside, including: a far-infrared camera for detecting an electromagnetic wave in a far-infrared radiation region; a visible-light camera for detecting a visible light, the visible-light camera including a luminance determining portion for determining the situation depending on a luminance of the detected visible light, and a lightness determining portion for determining the situation depending on lightness of the detected visible light; and a switching-over portion for switching an image captured by the far-infrared camera, and an image captured by the visible-light camera over to each other in accordance with the determination made by the luminance determining portion and the determination made by the lightness determining portion.

5 Claims, 4 Drawing Sheets

IMAGE PICKUP APPARATUS AND A SWITCHING-OVER METHOD FOR THE SAME

CROSS REFERENCES TO RELATED APPLICATIONS

The present invention contains subject matter related to Japanese Patent Application JP 2007-167129 filed in the Japan Patent Office on Jun. 26, 2007, the entire contents of which being incorporated herein by reference.

BACKGROUND OF THE INVENTION

1. Field of the Invention

The present invention relates to an image pickup apparatus and a switching-over method for the same. In particular, the invention relates to an image pickup apparatus which outputs an image corresponding to a situation of a subject to the outside, and a switching-over method for the image pickup apparatus including a far-infrared camera for detecting an electromagnetic wave in a far-infrared radiation region, and a visible-light camera for detecting a visible light.

2. Description of the Related Art

Heretofore, there have been conceivable the various techniques for detecting a specific object within an image-capturing range by executing image processing based on an image signal obtained by capturing an image. Such techniques have been used in monitoring cameras and the like. In addition, there have also been known not only a visible-light camera for capturing an image by detecting a visible light, but also a near-infrared camera and a far-infrared camera. These cameras can identify objects by detecting temperatures of objects of the image-capturing.

Now, the visible-light camera and the infrared camera (far-infrared camera) capture different objects each of which can be relatively identified owing to the respective different characteristics. For this reason, there is known a hybrid camera including both the functions of the visible-light camera and the far-infrared camera. In general, with the hybrid camera, when a user determines that a video picture captured by the visible-light camera becomes dark by seeing an image received from the hybrid camera, he/she switches the visible-light camera over to the far-infrared camera.

Here, there is known a technique for automatically switching the visible-light camera and the far-infrared camera over to each other in accordance with an ambient luminance (a level of a detected signal). This technique, for example, is described in Japanese Patent Laid-Open Nos. 2002-142228, 2005-006066, and 2005-286535. The excellent visibility is obtained in an image capturing night and day by using these techniques.

SUMMARY OF THE INVENTION

Now, in such a situation that in spite of the daytime, the fog rises or the dust flutters about, the excellent visibility is obtained in an image captured by the far-infrared camera rather than in an image captured by the visible-light camera in some cases. However, the hybrid camera in the related art involves a problem that an image excellent in visibility can not be necessarily obtained because it can not distinguish the fog and the dust from each other.

The present embodiment has been made in the light of such circumstances, and it is therefore desire to provide an image pickup apparatus which is capable of obtaining an image excellent in visibility depending on the situation, and a switching-over method for the same.

In order to attain the desire described above, according to an embodiment of the present invention, there is provided an image pickup apparatus for outputting an image corresponding to a situation of a subject to an outside, including:

a far-infrared camera for detecting an electromagnetic wave in a far-infrared radiation region;

a visible-light camera for detecting a visible light, the visible-light camera having a luminance determining portion for determining the situation depending on a luminance of the detected visible light, and a lightness determining portion for determining the situation depending on lightness of the detected visible light; and a switching-over portion for switching an image captured by the far-infrared camera, and an image captured by the visible-light camera over to each other in accordance with the determination made by the luminance determining portion and the determination made by the lightness determining portion.

According to the embodiment of the present invention, the switching-over portion switches the image captured by the far-infrared camera, and the image captured by the visible-light camera over to each other in accordance with the determination made by the luminance determining portion, and the determination made by the lightness determining portion.

According to another embodiment of the present invention, there is provided a switching-over method for an image pickup apparatus including a far-infrared camera for detecting an electromagnetic wave in a far-infrared radiation region, and a visible-light camera for detecting a visible light, the switching-over method including the steps of:

determining a situation of a subject depending on a luminance of the visible light detected by the visible-light camera by a luminance determining portion;

determining the situation of the subject depending on lightness of the visible light detected by the visible-light camera by a lightness determining portion; and switching an image captured by the far-infrared camera, and an image captured by the visible-light camera over to each other in accordance with the determination made by the luminance determining portion and the determination made by the lightness determining portion.

According to the present invention, since not only the determination based on the luminance is made, but also the determination based on the lightness is made, the image excellent in visibility can be provided depending on the situation.

DETAILED DESCRIPTION OF THE PREFERRED EMBODIMENTS

A preferred embodiment of the present invention will be described in detail hereinafter with reference to the accompanying drawings. An image pickup apparatus which will be described in the following embodiment includes two kinds of cameras which can respectively detect lights (electromagnetic waves), having different frequency bands, reflected by or radiated from a subject. Such an image pickup apparatus is referred to as "a hybrid camera" herein.

Figure 1:
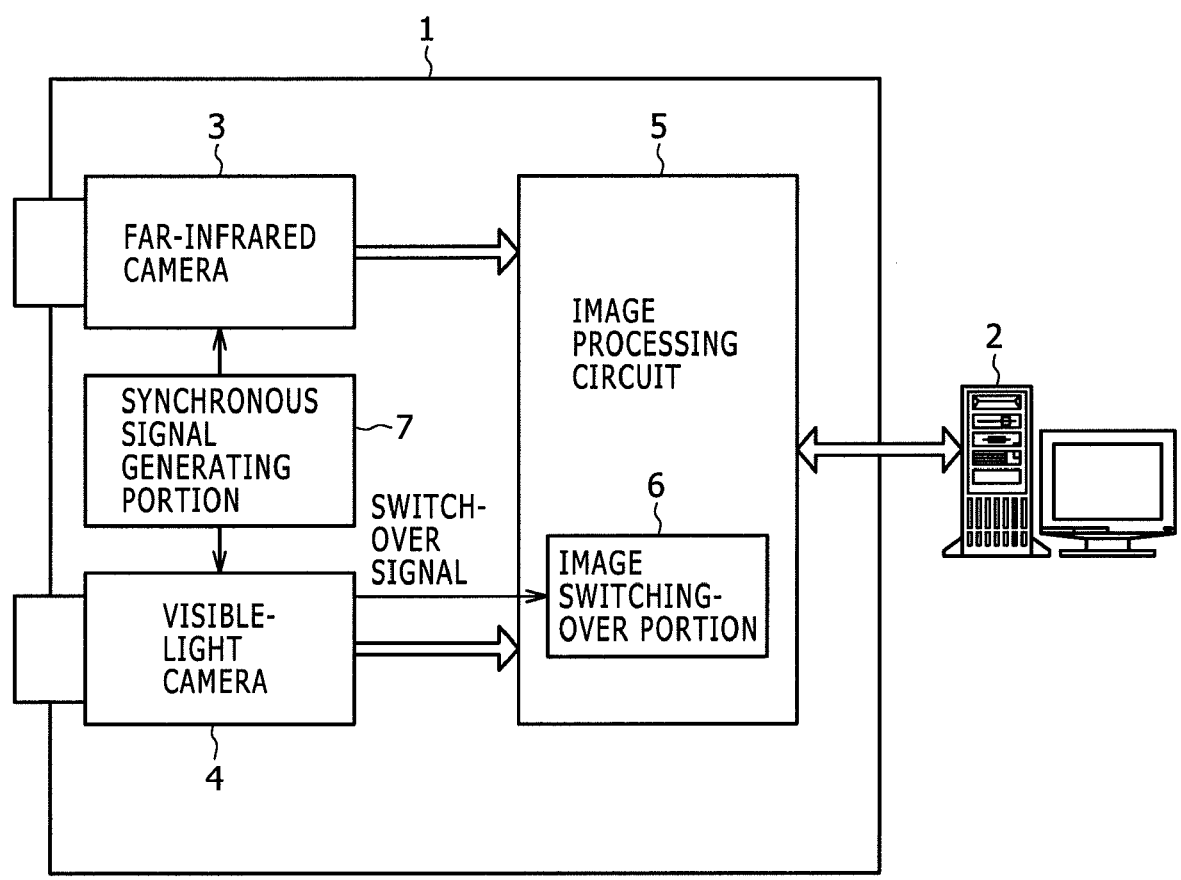
FIG. 1 is a block diagram schematically showing a configuration of an image pickup system including a hybrid camera according to an embodiment of the present invention.

FIG. 1 is a block diagram schematically showing a configuration of an image pickup system including a hybrid camera according to the embodiment of the present invention.

The image pickup system shown in FIG. 1 includes the hybrid camera 1 and a server 2.

The hybrid camera 1 mainly includes a far-infrared camera 3, a visible-light camera 4 and an image processing circuit 5. In this case, the far-infrared camera 3 can detect the electromagnetic wave in a far-infrared radiation region. The visible-light camera 4 can detect a visible light. Also, the image processing circuit 5 executes signal processing by using an image captured by the far-infrared camera 3, and an image captured by the visible-light camera 4.

The hybrid camera 1 is connected to the server 2 through a communication line. For example, an output image from the hybrid camera 1 can be displayed on a monitor connected to the server 2. Or, operation control and various settings for the hybrid camera 1 can be carried out on the server 2 side.

The far-infrared camera 3 and the visible-light camera 4 capture an image of a subject in the same direction. The far-infrared camera 3, for example, includes a pyroelectric element, a bolometer or the like for detecting an energy (heat) of a far-infrared radiation radiated as a sensor for detecting the far-infrared radiation. In addition, the visible-light camera 4, for example, includes a solid-state image pickup element such as a charge coupled device (CCD) or a complementary metal oxide semiconductor (CMOS) type image sensor as a sensor for detecting the visible light.

The image processing circuit 5 executes various kinds of signal processing based on image signals obtained through image capturing made by the far-infrared camera 3 and the visible-light camera 4, respectively. In particular, in this embodiment, the image processing circuit 5 executes such signal processing as to detect a specific object from the image capturing range based on both the image signals, and as to clearly specify the detection of the object within the output image.

It is noted that the far-infrared camera 3 and the visible-light camera 4 have functions of converting output signals from respective sensors into digital signals. The image processing circuit 5 executes the image processing based on the digital signals outputted from the far-infrared camera 3 and the visible-light camera 4, respectively. Also, the far-infrared camera 3 and the visible-light camera 4 may respectively include sensors which are different in number of pixels from each other. However, in this case, a resolution conversion function is provided inside each of the far-infrared camera 3 and the visible-light camera 4. Thus, digital image signals corresponding to the same number of pixels per frame (for example, an image having 256 gradations obtained through the 8-bit digitization) are outputted from the far-infrared camera 3 and the visible-light camera 4 to the image processing circuit 5.

It is noted that the far-infrared camera 3 and the visible-light camera 4 do not necessarily carry out the image capturing operations perfectly at the same timing. For example, the intervals of the image capturing in the far-infrared camera 3 and the visible-light camera 4 may be made different from each other. Needless to say, the intervals of the image capturing in the far-infrared camera 3 and the visible-light camera 4 preferably are close to each other as much as possible.

In addition, the output image obtained from the image processing circuit 5 of the hybrid camera 1 can be displayed on the monitor of the sensor 2. Or, the operation control and the various settings for the hybrid camera 1 can be carried out on the server 2 side.

An image switching-over portion 6 switches the image captured by the far-infrared camera 3, and the image captured by the visible-light camera 4 over to each other to output corresponding one of the two images to the server 2. Specifically, when a switch-over signal having a logical value of "1" is inputted from the visible-light camera 4, the image switching-over portion 6 outputs the image captured by the far-infrared camera 3 to the server 2. On the other hand, when a switch-over signal having a logical value of "0" is inputted from the visible-light camera 4, the image switching-over portion 6 outputs the image captured by the visible-light camera 4 to the server 2.

Figure 2:
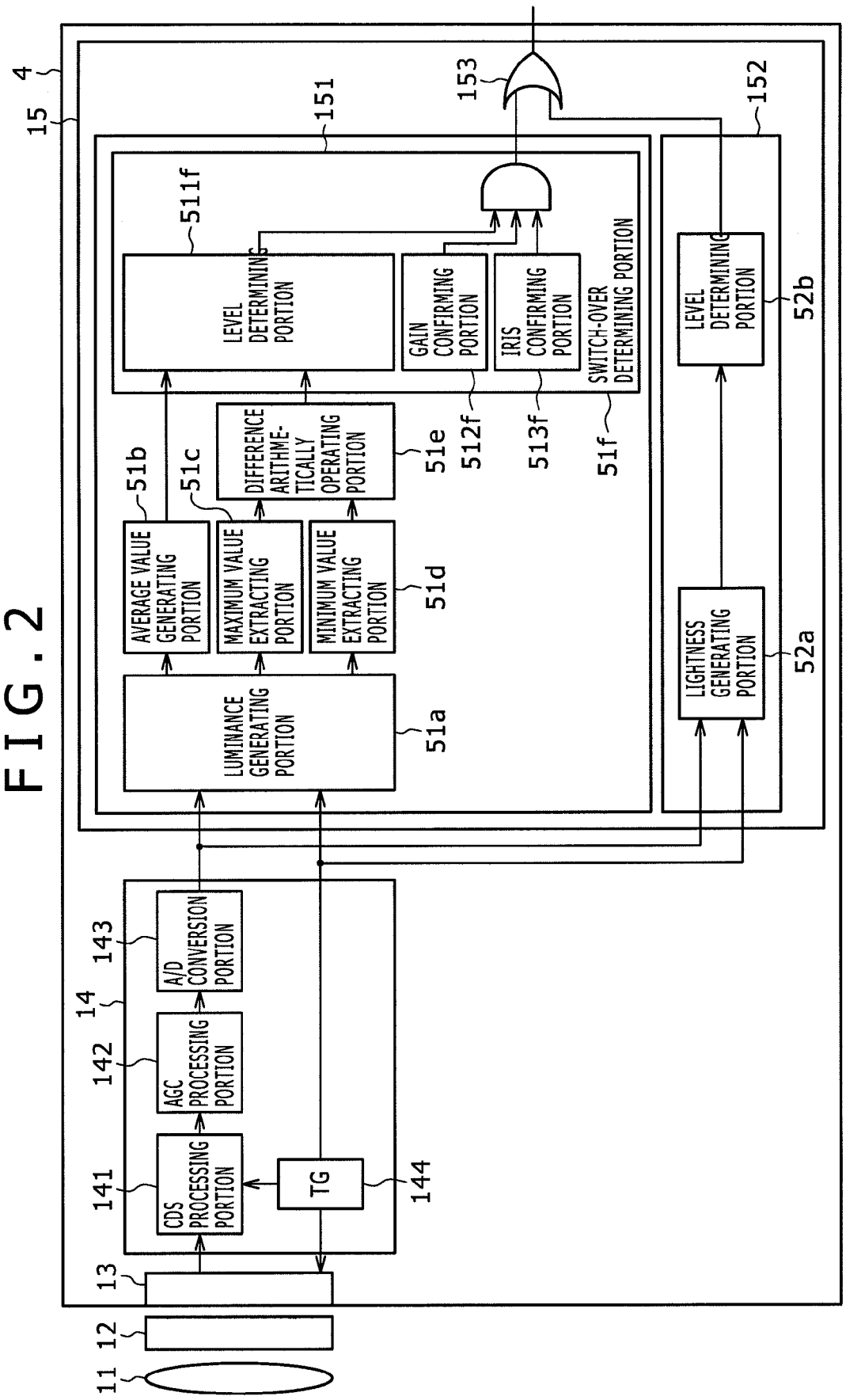
FIG. 2 is a block diagram, partly in circuit, showing a configuration of a visible-light camera in the hybrid camera according to the embodiment of the present invention.

A synchronous signal generating portion 7 generates a synchronous signal in accordance with which image data on the images captured approximately at the same time and at the same timing by the far-infrared camera 3 and the visible-light camera 4, respectively, is outputted to the image generating circuit 5. FIG. 2 is a block diagram, partly in circuit, showing a configuration of the visible-light camera 4.

The visible-light camera 4 is composed of a lens 11, a shutter 12, a solid-state image element 13, a CCD controlling portion 14, and an image processing circuit 15.

The lens 11 condenses a light radiated from or reflected by a subject onto the solid-state image element 13.

When the shutter 12 is only slightly released, the visible light passes through the lens 11 to reach the solid-state image element 13.

In this embodiment, the solid-state image element 13 is a CCD sensor having nine pixels of 3(raw)×3(column).

The CCD controlling portion 14 is a circuit for executing analog front end processing containing A/D conversion processing for the image signal. The CCD controlling portion 14 is composed of a CDS processing portion 141, an AGC processing portion 142, a 8-bit A/D conversion portion 143, and a TG 144.

The CDS processing portion 141 removes an amplifier noise and a reset noise.

The AGC processing portion 142 executes processing for increasing a gain whenever the subject becomes dark. In this case, the gain takes a value ranging from "0" to "10", and the gain value of "10" represents a maximum amount of gain.

The TG 144 generates a timing signal in accordance with which the solid-state image pickup element 13 and the CDS processing portion 141 are controlled.

Next, operations of the lens 11 to the CCD controlling portion 14 will now be described in brief.

An analog image signal obtained through the photoelectric conversion in the solid-state image pickup element 13 is inputted to the AGC processing portion 142 through the CDS processing portion 141.

The AGC processing portion 142 determines the gain for the output data from the sensor. Also, the A/D conversion portion 143 digitizes the analog image signal inputted thereto, and outputs the resulting digital signal to the image processing circuit 15.

The image processing circuit 15 is composed of a luminance determining portion 151, a lightness determining portion 152, and an OR circuit 153.

The timing signal is inputted from the TG 144 to each of the luminance determining portion 151 and the lightness determining portion 152. Thus, the luminance determining portion 151 and the lightness determining portion 152 operate synchronously with each other.

The luminance determining portion 151 is a portion for determining a luminance about the image signal inputted thereto. Also, the luminance determining portion 151 is composed of a luminance generating portion 51a, an average value generating portion 51b, a maximum value extracting portion 51c, a minimum value extracting portion 51d, a difference arithmetically operating portion 51e, and a switch-over determining portion 51f.

The luminance generating portion 51a generates luminance values for the nine pixels of the solid-state image pickup element 13 from the digital signal obtained through the digitization in the A/D conversion portion 143. Here, the luminance values generated by the luminance generating portion 51a have 8 bits each, that is, range from "0" to "255". The luminance value of "0" represents that the object is darkest, while the luminance value of "255" represents that the object is brightest.

The average value generating portion 51b generates an average value of the luminance values, for all the pixels of the solid-state image pickup element 13, generated by the luminance generating portion 51a.

The maximum value extracting portion 51c extracts a maximum value of the luminance values, for all the pixels of the solid-state image pickup element 13, generated by the luminance generating portion 51a.

The minimum value extracting portion 51d extracts a minimum value of the luminance values, for all the pixels of the solid-state image pickup element 13, generated by the luminance generating portion 51a.

The difference arithmetically operating portion 51e arithmetically operates a difference between the maximum value and the minimum value, thereby acquiring a difference value.

The switch-over determining portion 51f is provided for the purpose of determining ambient brightness (darkness). Also, the switch-over determining portion 51f is composed of a level determining portion 511f, a gain confirming portion 512f, an IRIS confirming portion 513f, and an AND circuit 514f.

The level determining portion 511f determines whether or not the values inputted thereto fulfill conditions which are previously given for the purpose of determining bright and dark. For example, when the level of the inputted average value is equal to or smaller than "20", and the inputted difference value (the difference between the maximum value and the minimum value) is equal to or smaller than "10", the level determining portion 511f determines that the conditions are fulfilled, and outputs an output signal having a logical value of "1" to the AND circuit 514f. In any of the cases other than the above case, the level determining portion 511f determines that the conditions are not fulfilled, and outputs an output signal having a logical value of "0" to the AND circuit 514f.

The gain confirming portion 512f checks a gain amount (ranging from "0" to "10") in the AGC processing portion 142. When the gain amount is "10", the gain confirming portion 512f outputs an output signal having a logical value of "1" to the AND circuit 514f. In any of the cases other than the above case, the gain confirming portion 512f outputs an output signal having a logical value of "0" to the AND circuit 514f.

The IRIS confirming portion 513f checks to see if the shutter 12 is perfectly released. When the shutter 12 is perfectly released, the gain confirming portion 512f outputs an output signal having a logical value of "1" to the AND circuit 514f. In any of the cases other than the above case, the gain confirming portion 512f outputs an output signal having a logical value of "0" to the AND circuit 514f.

When all the logical values of the output signals outputted from the gain determining portion 511f, the gain confirming portion 512f, and the IRIS confirming portion 513f are "1", the AND circuit 514f outputs a luminance switch-over signal having a logical value of "1" to the OR circuit 153 which will be described later. In any of the cases other than the above case, the AND circuit 514f outputs a luminance switch-over signal having a logical value of "0" to an OR circuit 153.

The lightness determining portion 152 is a portion for determining the lightness about the image signal inputted thereto. Also, the lightness determining portion 152 is composed of a lightness generating portion 52a and a level determining portion 52b.

In the case where the solid-state image pickup element 13 is of a single plate type, the lightness generating portion 52a arithmetically operates and generates lightness values of the nine pixels of the solid-state image pickup element 13 from the digital signal obtained from the A/D conversion portion 143. Here, the primaries of red, green, and blue (RGB) exist as the lightness thus generated. Each of red, green, and blue gets a value ranging from "0" to "255" as the lightness value. When all the lightness values of red, green, and blue are "255", the image becomes white.

The level determining portion 52b determines whether or not the lightness values generated by the lightness generating portion 52a fulfill criteria. The criteria are not especially limited. In this embodiment, however, when as an example, the pixels meeting the conditions of "red−"3"<green<red+"3"", "green−"3"<blue<green+"3"", and "blue−"3"<red<blue+"3"" exceed 85% of all the pixels, the level determining portion 52b determines that red, green, and blue have approximately the same value (in a state in which it is difficult to capture an image of the normal scenery). Thus, the level determining portion 52b determines that the visible-light camera 4 photographs the fog or the dust, and outputs a lightness switch-over signal having a logical value of "1" to the OR circuit 153.

The OR circuit 153 arithmetically operates a logical sum (OR) of the luminance switch-over signal and the lightness switch-over signal. When at least one of the AND circuit 514f and the level determining portion 52b outputs the signal having the logical value of "1" to the OR circuit 153, the OR circuit 153 outputs a switch-over signal having a logical value of "1" to the image switching-over portion 6 (refer to FIG. 1).

Next, processing executed in the image processing circuit 15 will now be described. Firstly, processing executed in the luminance determining portion 151 will be described, and secondly, processing executed in the lightness determining portion 152 will be described.

<Processing in Luminance Determining Portion>

Figure 3:
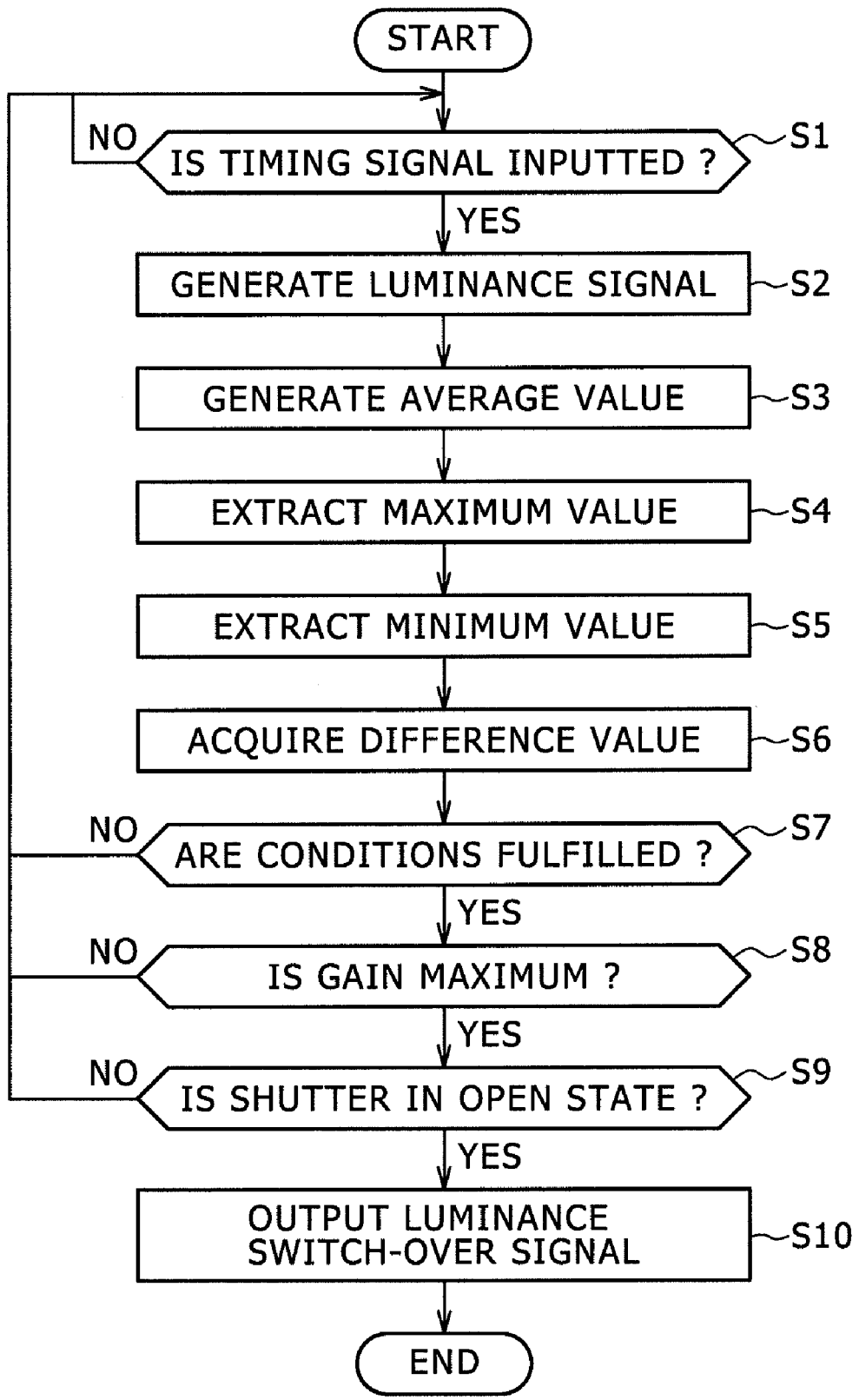
FIG. 3 is a flow chart showing processing executed by a luminance determining portion in the visible-light camera shown in FIG. 2; and
}

FIG. 3 is a flow chart showing the processing executed in the luminance determining portion.

Firstly, the luminance generating portion 51a determines whether or not the timing signal is outputted thereto from the TG 144 (Step SI).

When it is determined in Step S1 that the timing signal is not yet inputted thereto from the TG 144 (No: in Step S1), the luminance generating portion 51b waits ready for input of the timing signal from the TG 144.

When it is determined in Step S1 that the timing signal is inputted from the TG 144 to the luminance generating portion 51a (Yes: in Step S1), the luminance generating portion 51a generates the luminance values for all the pixels of the solid-state image pickup element 13 from the digital signal inputted thereto from the CCD controlling portion 14 (Step S2).

Next, the average value generating portion 51b generates the average value of the luminance values generated by the luminance generating portion 51a (Step S3).

Next, the maximum value extracting portion 51c extracts the maximum value of the luminance values generated by the luminance generating portion 51a (Step S4).

Next, the minimum value extracting portion 51d extracts the minimum value of the luminance values generated by the luminance generating portion 51a (Step S5).

Next, the difference arithmetically operating portion 51e arithmetically operates the difference between the maximum value and minimum value thus extracted to acquire the difference value (Step S6).

The level determining portion 511f determines whether or not the difference value inputted thereto is a value fulfilling the given conditions (Step S7).

When it is determined in Step S7 that the difference value inputted thereto is not the value fulfilling the given conditions (No: in Step S7), the operation proceeds to the processing in Step S1, and the processing in and after Step S1 is continuously executed.

On the other hand, when the difference value inputted thereto is the value fulfilling the given conditions (Yes: in Step S7), the level determining portion 511f outputs an output signal having a logical value of "1" to the AND circuit 514f.

Next, the gain confirming portion 512f determines whether or not the gain is maximum (Step S8). When it is determined in Step S8 that the gain is not maximum (No: in Step S8), the operation proceeds to the processing in Step S1, and the processing in and after Step S1 is continuously executed.

On the other hand, when it is determined in Step S8 that the gain is maximum (Yes: in Step S8), the gain confirming portion 512f outputs an output signal having a logical value of "1" to the AND circuit 514f.

Next, the IRIS confirming portion 513f determines whether or not the shutter 12 is in a release state (Step S9). When it is determined in Step S9 that the shutter 12 is not in the release state (No: in Step S9), the operation proceeds to the processing in Step S1, and the processing in and after Step S1 is continuously executed.

On the other hand, when it is determined in Step S9 that the shutter 12 is in the release state (Yes: in Step S9), the IRIS confirming portion 513f outputs an output signal having a logical value of "1" to the AND circuit 514f.

The output signals each having the logical value of "1" are outputted from the level determining portion 511f, the gain confirming portion 512f, and the IRIS confirming portion 513f to the AND circuit 514f. Thus, the AND circuit 514f outputs the luminance switch-over signal having a logical value of "1" to the OR circuit 153 (Step S10).

As a result, the OR circuit 153 outputs an output signal having a logical value of "1", and thus the image processing circuit 15 outputs the switch-over signal having a logical value of "1" to the image switching-over portion 6 of the image processing circuit 5.

Note that, in this embodiment, firstly, the level determining portion 511f makes the determination in Step S7, the gain confirming portion 512f makes the determination in Step S8, and finally the IRIS confirming portion 513f makes the determination in Step S9. However, in the present embodiment, the order of making these determinations is not especially limited thereto.

<Processing in Lightness Determining Portion>

Figure 4:
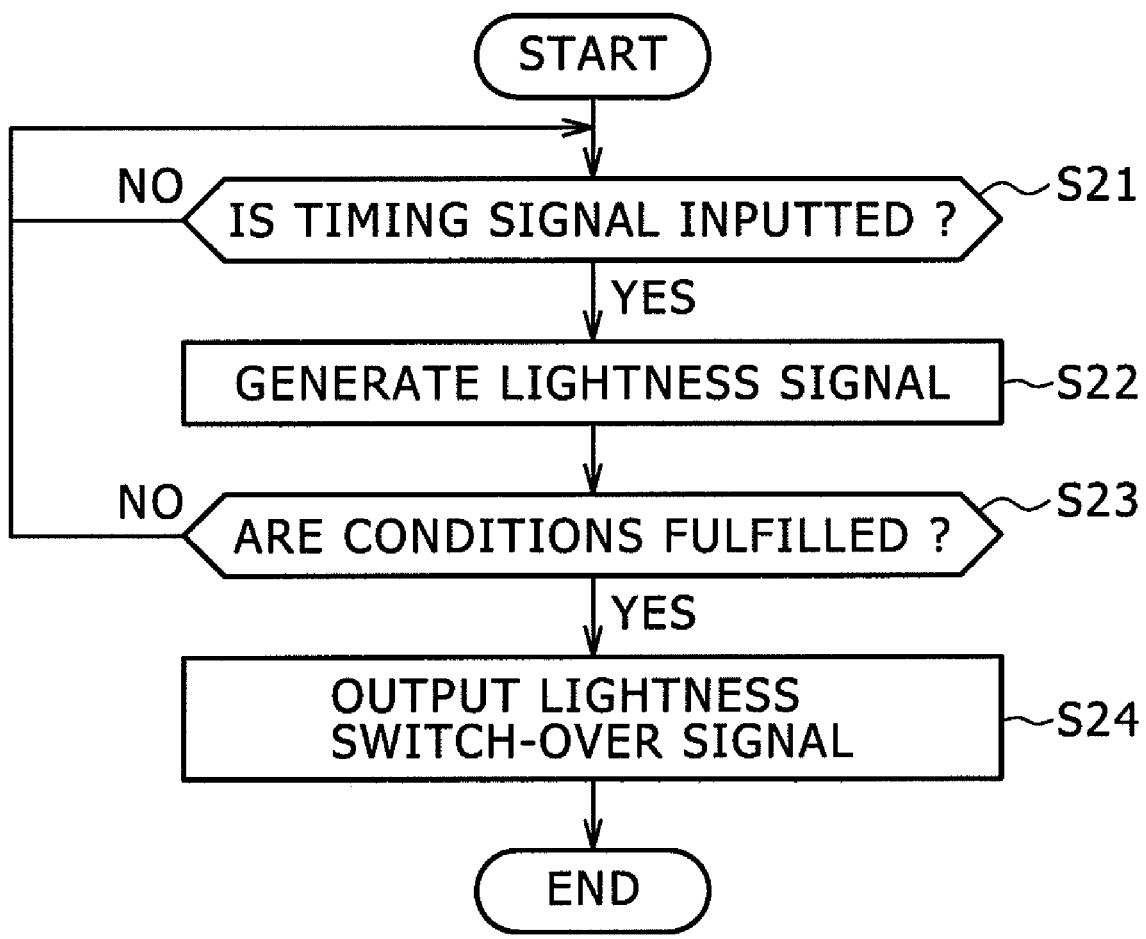
FIG. 4 is a flow chart showing processing executed by a lightness determining portion in the visible-light camera shown in FIG. 2.

FIG. 4 is a flow chart showing the processing executed in the lightness determining portion.

Firstly, the lightness determining portion 52a determines whether or not the timing signal is inputted thereto from the TG 144 (Step S21).

When it is determined in Step S21 that the timing signal is not yet inputted thereto from the TG 144 (No: in Step S21), the lightness determining portion 52a waits ready for the input of the timing signal from the TG 144.

On the other hand, when it is determined in Step S21 that the timing signal is inputted thereto from the TG 144 (Yes: in Step S21), the lightness determining portion 52a generates a lightness signal about the lightness value from the digital signal inputted thereto from the CCD controlling portion 14 (Step S22).

Next, the level determining portion 52b determines whether or not the lightness value of the lightness signal thus generated is a value fulfilling given conditions (Step S23).

When it is determined in Step S23 that the lightness value is not the value fulfilling the given conditions (No: in Step S23), the operation proceeds to the processing in Step S21, and the processing in and after Step S21 is continuously executed.

On the other hand, when it is determined in Step S23 that the lightness value is the value fulfilling the given conditions (Yes: in Step S23), the level determining portion 52b outputs the lightness switch-over signal having a logical value of "1" to the OR circuit 153 (Step S24).

As a result, the OR circuit 153 outputs the logical value of "1", and thus the image processing circuit 15 outputs the switch-over signal having a logical value of "1" to the image switching-over portion 6 of the image processing circuit 5.

Hereinafter, the operation of the hybrid camera 1 will be described by giving concrete examples.

<A: Determination Based on Luminance>

<A-1>

It is assumed that the luminance generating portion 51a generates the luminous values for the nine pixels of the solid-state image pickup element 13 in accordance with the timing signal inputted thereto from the TG 144, and these luminance values are "50", "75", "190", "120", "80", "180", "200", "90", and "160".

At this time, the average value generating portion 51b generates the average value, "116", of the luminance values for the nine pixels. The maximum value extracting portion 51c extracts the maximum value, "200", from these luminance values thus generated. The minimum value extracting portion 51d extracts the minimum value, "50", from these luminance values thus generated. Also, the difference arithmetically operating portion 51e arithmetically operates the difference between the maximum value and minimum value thus extracted to acquire the difference value "150".

<A-2>

Here, it is assumed that the level determining portion 511f is previously set such that when the level of the average value is equal to smaller than "20" and the difference value is equal to or smaller than "10", it is determined that the conditions are fulfilled (the subject is dark). The average value of the luminance values inputted this time is "116", and the difference value is "150". Therefore, the level determining portion 511f determines that the conditions are not fulfilled (the subject is bright). As a result, the level determining portion 511f outputs the output signal having a logical value of "0" to the AND circuit 514f. This leads to that the AND circuit 514f outputs the luminance switch-over signal having a logical value of "0" to the OR circuit 153.

<A-3>

It is also assumed that after a lapse of a given time, the luminance generating portion 51a generates the luminance values for the nine pixels of the solid-state image pickup element 13 in accordance with the timing signal inputted thereto from the TG 144, and these luminance values are "16", "18", "17", "16", "25", "22", "18", "17", and "16".

At this time, the average value generating portion 51b generates the average value, "18", of the luminance values for the nine pixels. The maximum value extracting portion 51c extracts the maximum value, "25", from these luminance values thus generated. The minimum value extracting portion 51d extracts the minimum value, "16", from these luminance values thus generated. Also, the difference arithmetically operating portion 51e arithmetically operates the difference between the maximum value and minimum value thus extracted to acquire the difference value "9". For this reason, the level determining portion 511f determines that the conditions are fulfilled (the subject is dark).

<A-4>

The gain confirming portion 512f confirms the level of the gain in the AGC processing portion 142, and the level of the gain therein is proved to be "8".

<A-5>

The IRIS confirming portion 513f confirms that the shutter is not in the release state.

<A-6>

It is assumed that after that, the luminance generating portion 51a immediately generates the luminance values for the nine pixels of the solid-state image pickup element 13, and these luminance values are "30", "35", "55", "80", "35", "70", "90", "85", and "95". At this time, the average value is "64", and the difference value is "65". Therefore, the level determining portion 511f determines that the conditions are not fulfilled (the subject is bright).

<A-7>

It is also assumed that after a lapse of a given time, the luminance generating portion 51a generates the luminance values for the nine pixels of the solid-state image pickup element 13 in accordance with the timing signal inputted thereto from the TG 144, and these luminance values are "16", "19", "18", "17", "24", "22", "17", "17", and "18". At this time, the average value is "18", and the difference value is "8". Therefore, the level determining portion 511f determines that the conditions are fulfilled (the subject is dark).

<A-8>

Here, the gain confirming portion 512f confirms that the value of the gain in the AGC processing portion 142 gets the maximum value of "10". In addition, The IRIS confirming portion 513f confirms that the shutter is in the release state.

<A-9>

So, the level determining portion 511f determines that the conditions are fulfilled, the gain confirming portion 512f confirms that the gain value is maximum, and the IRIS confirming portion 513f confirms that the shutter 12 is in the release state. Since these three conditions are established, the image processing circuit 15 outputs the luminance switch-over signal having a logical value of "1".

<A-10>

As a result, the luminance switch-over signal having the logical value of "1" is inputted to the image switching-over portion 6 of the image processing circuit 5. Thus, the image switching-over portion 6 switches the output image of the hybrid camera 1 from the image captured by the visible-light camera 4 over to the image captured by the far-infrared camera 3.

<B: Determination Based on Lightness>

<B-1>

The following situation is assumed here. That is to say, the lightness generating portion 52a generates the lightness values (red, green, and blue) for the nine pixels of the solid-state image pickup element 13 in accordance with the timing signal inputted thereto from the TG 144. These lightness values thus generated are (200, 205, 210), (220, 205, 210), (100, 205, 50), (80, 20, 210), (100, 90, 210), (190, 100, 50), (80, 75, 100), (120, 140, 80), and (20, 50, 240), respectively.

At this time, there is not even one pixel fulfilling the conditions of "red–"3"<green<red+"3"", "green–"3"<blue<green+"3"", and "blue–"3"<red<blue+"3"". Thus, the level determining portion 52b outputs the light switch-over signal having a logical value of "0" to the OR circuit 153.

<B-2>

The following situation is also assumed here. That is to say, the lightness generating portion 52a generates the lightness values for the nine pixels of the solid-state image pickup element 13 in accordance with the timing signal inputted thereto from the TG 144. These lightness values thus generated are (220, 222, 221), (211, 212, 213), (221, 220, 222), (222, 220, 221), (212, 211, 210), (190, 191, 192), (222, 223, 224), (215, 214, 216), and (226, 228, 200), respectively. Each of the eight pixels, other than the final pixel having the lightness values of (226, 228, 200), fulfills the conditions of "red–"3"<green<red+"3"", "green–"3"<blue<green+"3"", and "blue–"3"<red<blue+"3"". This means that of the nine pixels, the eight pixels (about 89%) each fulfill the above conditions. Therefore, the level determining portion 52b outputs the light switch-over signal having a logical value of "1" to the OR circuit 153.

<B-3>

As a result, the image processing circuit 15 inputs the switch-over signal having a logical level of "1" to the image switching-over portion 6. Then, the image switching-over portion 6 switches the output image of the hybrid camera 1 from the image captured by the visible-light camera 4 over to the image captured by the far-infrared camera 3.

As has been described so far, according to the image pickup system including the hybrid camera 1 of this embodiment, not only the determination based on the luminance is made, but also the determination based on the lightness is also made. Therefore, when in spite of the daytime, the entire picture is seen only as being white or gray due to the generation of the fog or the dust, the image captured by the visible-light camera 4 is automatically switched over to the image captured by the far-infrared camera 3. As a result, the image excellent in the visibility can be readily displayed.

It is noted that although in the embodiment, the description has been given with respect to the case where the image captured by the visible-light camera 4 is automatically switched over to the image captured by the far-infrared camera 3, in the reverse case as well, the switching-over can be made similarly to the former case. That is to say, when the image processing 15 inputs the switch-over signal having a logical value of "0" to the image switch-over portion 6, the image switching-over portion 6 switches the output image of the hybrid camera 1 from the image captured by the far-infrared camera 3 over to the image captured by the visible-light camera 4.

In addition, although in the embodiment, the hybrid camera 1 generates the switch-over signal, and transmits the image data on one of the two images to the server 2, the present embodiment is by no means limited thereto. That is to say, after the server 2 receives both the image data on the image captured by the far-infrared camera 3, and the image data on the image captured by the visible-light camera 2, the switching-over operation for the two images may be carried out on the server 2 side.

Although the image pickup apparatus and the switching-over method for the same of the present embodiment have been described so far based on the illustrated embodiment, the present embodiment is by no means limited thereto. That is to say, the constitutions of the portions can be replaced with any suitable ones of portions having the same functions. In addition, any other arbitrary constituent elements and processes may be added to the present embodiment.

In addition, in the present embodiment, arbitrary two or more constitutions (features) of the embodiment described above may be combined with one another.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus for outputting an image corresponding to a situation of a subject to an outside, comprising:
    a far-infrared camera configured for detecting an electromagnetic wave in a far-infrared radiation region;
    a visible-light camera configured for detecting a visible light, said visible-light camera including a luminance determining portion configured for determining the situation depending on a luminance of the detected visible light, and a lightness determining portion configured for determining the situation depending on lightness of the detected visible light;
    and a switching-over portion configured for switching an image captured by said far-infrared camera, and an image captured by said visible-light camera over to each other in accordance with the determination made by said luminance determining portion and the determination made by said lightness determining portion.

2. The image pickup apparatus according to claim 1, wherein said switching-over portion switches the image captured by said far-infrared camera over to the image captured by said visible-light camera when the lightness shows a given value irrespective of luminance values obtained from said luminance determining portion.

3. The image pickup apparatus according to claim 1, wherein said lightness determining portion is adapted to determine whether or not the situation is one of fog or dust depending on the lightness, and
    when said lightness determining portion determines that the situation is one of fog or dust, said switching-over portion switches the image captured by said far-infrared camera over to the image captured by said visible-light camera.

4. The image pickup apparatus according to claim 3, wherein when the lightness values of red, green, and blue in each of pixels of an image pickup element in said visible-light camera are approximately equal to one another, said lightness determining portion determines that the lightness values are ones of the fog or the dust.

5. A switching-over method for an image pickup apparatus including a far-infrared camera for detecting an electromagnetic wave in a far-infrared radiation region, and a visible-light camera for detecting a visible light, said switching-over method comprising the steps of:
    determining a situation of a subject depending on a luminance of the visible light detected by said visible-light camera by a luminance determining portion;
    determining the situation of the subject depending on lightness of the visible light detected by said visible-light camera by a lightness determining portion; and
    switching an image captured by said far-infrared camera, and an image captured by said visible-light camera over to each other in accordance with the determination made by said luminance determining portion and the determination made by said lightness determining portion.

* * * * *